M. C. DAVIS.

Sheep-Shearing Machines.

No. 6,024. Reissued Aug. 25, 1874.

Witnesses.
R. T. Campbell
J. H. Campbell

Inventor
M. C. Davis
by
Mann, Fenwick & Drummond

UNITED STATES PATENT OFFICE.

MARVEL C. DAVIS, OF GUILFORD, OHIO, ASSIGNOR TO ROSWELL T. SMITH, JOSEPH K. PRIEST, JOHN G. BLUNT, AND WM. EARL, JR.

IMPROVEMENT IN SHEEP-SHEARING MACHINES.

Specification forming part of Letters Patent No. 53,277, dated March 20, 1866; reissue No. 6,024, dated August 25, 1874; application filed July 3, 1873.

*To all whom it may concern:*

Be it known that I, MARVEL C. DAVIS, of Guilford, in the county of Medina and State of Ohio, have invented certain Improvements on Machines for Shearing Animals; and I do hereby declare that the following is a full, clear, and exact description thereof, reference being had to the accompanying drawings making part of this specification, in which—

Figure 1:
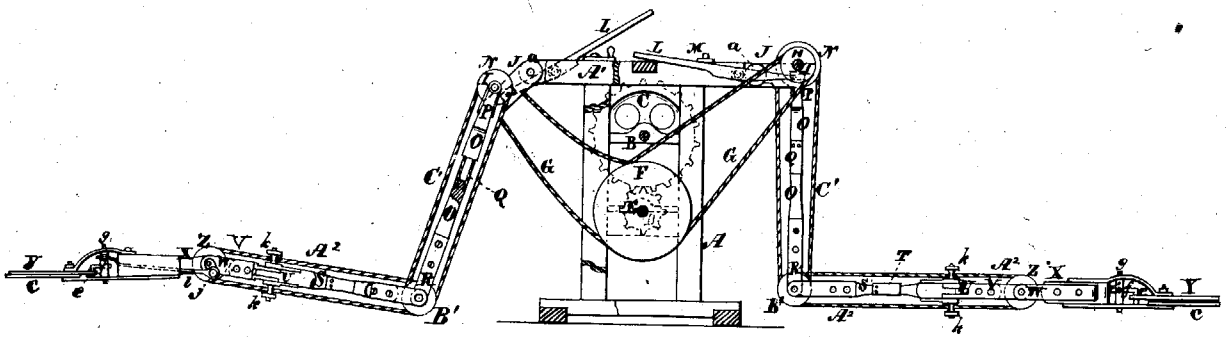
Figure 2:
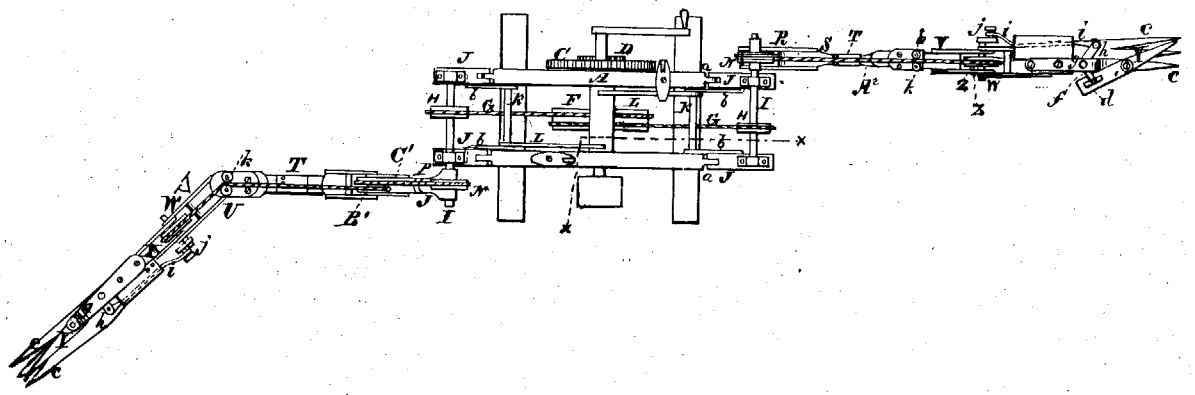

Figure 1 is a side elevation of my improved machine, partly in section, as indicated by dotted line *x x*. Fig. 2 is a top view.

Similar letters of reference indicate corresponding parts in the two figures.

The nature of my present improvement consists in certain combinations of parts, as hereinafter described, and as specifically claimed, whereby the first link of the jointed arm, to which the cutters are attached, is hung to the supporting-frame by a swinging hanger. The jointed arm has an additional movement in a horizontal plane, and the machine is adapted for shearing on two sides of the same frame at the same time, and may be used for shearing on only one side, as may be desired.

The following description of my invention will enable others skilled in the art to understand it.

In the accompanying drawings, A represents the upright portion of the supporting-frame, and A′ A′ represent two horizontal beams, which are on top of the uprights A, and extend out therefrom, so that the cutter-carrying arms can be suspended beneath them, as shown in Fig. 1. Near the upper end of the upright portion of the frame is a horizontal transverse shaft, B, on which is keyed a spur-wheel, C, which engages with a pinion, D, on another horizontal transverse shaft, E, arranged below the shaft B. On this shaft E there is also keyed a drum, F, around which two belts, G G, pass, which are carried upward and outward and passed around pulleys H H on shafts I I, the bearings of which are on arms J J, that are connected to beams A′ by joints *a a*, so that their outer extremities can be moved vertically. The arms J J have extensions *b b* secured to their inner sides, and these extensions are secured to shafts K, having their end bearings in the overhanging portions of the beams A′ A′. The shafts K have levers L secured to them, by moving which the outer ends of the arms J J can be raised or depressed, and when raised, as shown on one side of the frame in Fig. 1, they can be rigidly fixed by turning over them the buttons M. The object of the adjustable arms J J is to allow the shafts I I to be depressed and the belts G G to be slackened. By this means either one of the shearing devices can be thrown out of gear and its motion stopped.

The cutters and their arms on both sides of the frame A are constructed precisely alike, for which reason I shall only describe those on one side of the frame.

From the shaft I is hung a bar, O, which is composed of two sections connected by a swivel-joint, Q, which allows the lower section of this bar to oscillate about its long axis. The bar O is allowed to swing freely on the shaft I, to which its upper section is permanently hung by a strap or hanger, P, and the lower end of the lower section is connected by a hinge-joint, R, to a bar, S, which latter is also composed of two sections connected by a swivel-joint, T. The outer end of the bar S is connected by a hinge-joint, U, to a bar, V, which latter joint allows the bars to work at right angles to the hinge-joint R, and the outer end of the bar V is connected by a hinge-joint, W, to a bar, X, the joint W working at right angles to the joint U, and, consequently, in a direction corresponding to the joint R. This arrangement of hinge and swivel joints admits a perfectly flexible connection of the bars O S V X, so that the cutters, which are attached to the outer bar X, may be unrestrainedly manipulated in any direction and passed over the body and limbs of an animal with great facility. The cutters or shears are composed of three or more stationary or fixed cutters, *c*, which are secured to the under side of the bar X, and a pivoted vibrating cutter, Y, works over the upper surfaces of the fixed cutters. The cutter Y has an oblong slot, *d*, through its rear part, to receive a pin, *e*, at the front end of a rod, *f*, which is attached to an arbor, *g*. An arm, *h*, projects from the arbor *g*, and is connected, by means of a rod, *i*, to a cranked wrist-pin, *j*, on one end of the pivot of pulley Z, at the joint W. The pulley Z is driven by a belt, $A^2$, from a pulley, B′, which is applied on the pintle of the hinge-joint R, and the pulley B′ is driven by a belt, C′, from the pulley N on shaft I. The belt $A^2$ passes between rollers *k k* at the outer ends of the bar S, which rollers prevent this belt slipping off the pulley N. By these means it will be seen that a vibrating motion can be communicated to the cutter Y while it is moved about in any direction or passed over the body and limbs of an animal in shearing the same. It will also be seen that two persons can work at the machine at the same time and shear two animals, while, if desired, either cutter may be stopped independent of the other by simply releasing the lever L, which holds up the arm.

Having described my invention, what I claim as new, and desire to secure by Letters Patent, is—

1. The combination of bar O with its hanger P and joint Q, shaft I, and the gearing N, B′, and C′, substantially as described.

2. The combination of the bar O, bar S, bar V with its guides *k k*, and bar X, jointed as described, and the gearing N, C′, B′, Z, and $A^2$, substantially as and for the purposes described.

3. The combination of the pendent rod or link O, frame A, hinged arm J, and gearing G, F, N, B′, H, and C′, substantially as described.

Witness my hand and seal in the matter of my application for reissue of my Letters Patent for a sheep-shearing machine.

MARVEL C. DAVIS. [L. S.]

Witnesses:
JENNIE E. DAVIS,
JOSEPH ROSS.